United States Patent
Bakke

[15] 3,657,524
[45] Apr. 18, 1972

[54] DUAL MODE PROCESS CONTROL WITH CONTINUOUS FEEDBACK DURING COARSE MODE

[72] Inventor: Roger M. Bakke, Los Gatos, Calif.
[73] Assignee: International Business Machines Corporation, Armonk, N.Y.
[22] Filed: June 15, 1970
[21] Appl. No.: 46,349

[52] U.S. Cl. ..........................................235/150.1, 318/561
[51] Int. Cl. ..............................................................G05b 17/02
[58] Field of Search .........................235/150.1, 151, 151.1; 318/560

[56] References Cited

UNITED STATES PATENTS 3,446,946  5/1969  Andeen .............................235/150.1

*Primary Examiner*—Eugene G. Botz
*Attorney*—Hanifin and Jancin and John H. Holcombe

[57] ABSTRACT

Dual mode process control having a coarse mode employing feedforward to change the process at a time-optimal rate to a new condition, and having a fine mode employing feedback for maintaining the process in the set condition. In coarse mode, a continuous prediction of the response of the controlled variable is made and is compared to the continuous feedback also used in fine mode. Any difference therebetween comprises an error and is employed to alter the coarse mode control of the manipulated variable. Thus, if an inaccuracy exists in the feedforward model of the process or if some outside change should occur to the process while in coarse mode, it is compensated for by adjustment to the coarse mode control of the manipulated variable.

10 Claims, 11 Drawing Figures

*INVENTOR*
ROGER M. BAKKE

BY *John H. Holcombe*

ATTORNEY

DUAL MODE PROCESS CONTROL WITH CONTINUOUS FEEDBACK DURING COARSE MODE

BACKGROUND OF THE INVENTION

1. Field of the Invention

The invention relates to dual mode process control and, more particularly, to real time compensation of coarse mode operation.

2. Description of Prior Art

Conventional dual mode process control comprises a fine mode employing feedback for maintaining the process in a set condition and a separate coarse mode employing feedforward to change the process at or near the fastest possible rate to a new condition. These two modes are regarded as separate types of operation and the process control system switches between the two modes as required.

The object of fine mode process control is to maintain the process in a set condition despite external changes and despite certain changes in input to the process. It has been recognized that feedback control alone was often not completely adequate due to the time delay of the process itself. A change affecting the process will often not become apparant at the controlled output until after a period of time. Therefore, many techniques have been developed to monitor various inputs and various conditions along the process to provide various feedback loops or to provide estimates of the effect on the process by such changes. By combining certain of these signals to control a manipulated variable, closer control may be maintained over the process to better assure that the process output variable does not change.

Coarse mode, however, varies a manipulated variable in order to change the state of the process and thereby the controlled process output variable. Since feedback is conventionally employed to detect changes from the desired set state, it is recognized that feedback could is not the most efficient means to change the state of the process. Further, the intermediate time spent between the old and new desired states is normally a loss. Hence, the transition between states must be accomplished at the fastest possible rate, called "time-optimal" rate. Extensive effort has been spent developing techniques to determine accurately the model equations for processes. This is so that the developed model equations could be employed in feedforward techniques to estimate the changes in the manipulated variable required to change the controlled variable of the process to the new state at the time-optimal rate. When feedforward employing the model equations indicates that the new state has been approximately reached, coarse mode is terminated and fine mode reinstituted.

Coarse mode operation is therefore dependent upon the accuracy of the equations developed as a model of the process. Further, no recognition is given external disturbances to the process that occur during coarse mode. The changes to the manipulated variable are those dictated by the model equations and any disturbances are assumed to produce negligible effect. Therefore, the entire development effort has been spent on developing techniques to accurately determine the model equations.

Thus, operation of a process during coarse mode is sensitive to inaccuracies in the model and does not reflect any disturbances impacting the process not expected and accounted for by the model.

SUMMARY OF THE INVENTION

It is therefore an object of the present invention to provide a dual mode process control method and system for reducing sensitivity to modeling and for compensating for disturbances occurring during coarse mode.

Briefly, the invention comprises a method and system of process control for operating a process in coarse mode to change a controlled variable of the process to a new condition at the optimum rate in response to a command designating the new condition employing both feedforward and feedback. A control signal is provided to control a manipulated variable of the process in a feedforward manner to cause the change of the controlled variable at the optimum rate. Based upon a predetermined model of the process, a continuous predicted response of the controlled variable to the control of the manipulated variable is determined. The actual response of the controlled variable is continuously measured. The determined predicted response is compared to the measure actual response of the controlled variable to provide an error signal indicating both the direction and magnitude of the difference therebetween. The resultant error signal is algebraically summed with the control signal to provide an output signal for controlling the manipulated variable in accordance therewith.

DESCRIPTION OF THE PREFERRED EMBODIMENT

As discussed above, conventional dual mode process control includes a fine mode employing feedback for maintaining the process in a steady state condition and a separate coarse mode employing feedforward to change the process at or near the fastest possible rate to a new condition. These two modes of control are regarded as totally separate types of operations and the conventional system switches between the two modes as required.

The present invention comprises a method and system employing both feedforward and feedback when operating a process in coarse mode to change a controlled variable to a new condition at the optimum rate in response to a command designating the new condition.

Figure 1:
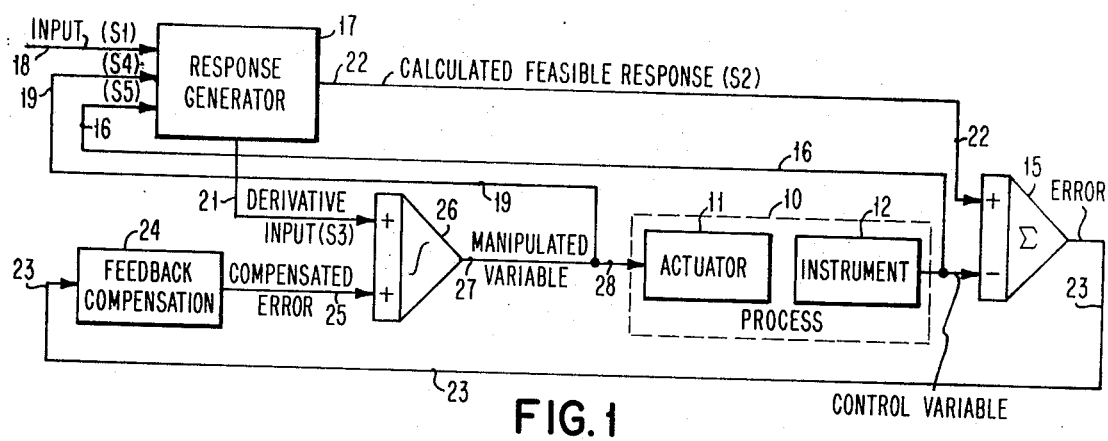
FIG. 1 comprises a diagrammatic illustration of a process and a dual mode control system therefor constructed in accordance with the present invention.

Referring to FIG. 1, a process 10, or stage within a process, is shown. The manipulated variable of the process 10 is controlled by an actuator 11. The controlled variable of the process 10 is measured by means of an instrument 12.

The type of process 10 suitable for implementation of the present invention would be continuous in operation and would have more than one steady state operating condition. For example, a distillation unit running on a continuous basis, but capable of producing products of different composition or operating on different throughputs is a process to could this invention would be applied. Actuator 11 may be any type of actuating means commensurate with the variable to be manipulated. Examples of such actuators are valves, motors and heaters. The instrument 12 may be any type of instrument commensurate with the type of controlled variable to be measured. Examples of such instruments are flowmeters, thermocouples, rate sensors and position potentiometers.

The instrument 12 provides signals at output 13 representing the value of the controlled variable which is measured thereby. In the embodiment shown in FIG. 1, the output of instrument 12 comprises analog electrical signals. In other embodiments, the output may comprise digitally encoded electrical signals, or pneumatic, hydraulic or fluidic analog signals. The signals at output 13 are supplied on line 14 to a summing amplifier 15, and on line 16 to a response generator 17.

Another input to response generator 17 comprises input line 18. The signal on input line 18 may be derived from a manual potentiometer setting, a manual switch setting or an analog or a digital output of other data processing apparatus. In the embodiment of FIG. 1, the signal on line 18 must be an analog electrical signal. Another input to response generator 17 comprises line 19 having signals representing the value of the manipulated variable control signals supplied to control the setting of actuator 11.

Response generator 17 operates on the three supplied inputs, as will be described in detail hereinafter, and provides two outputs on, respectively, lines 21 and 22. As illustrated, summing amplifier 15 subtracts the controlled variable signal on line 14 from the signal on line 22 and supplies a net error signal on line 23. A net error signal represents a position error and supplies to feedback compensation circuitry 24. This circuitry, for example, may divide the signal on line 23 by process gain, as will be described, and provides the derivative of the divisor, called the compensated error, and supplies this error signal on line 25 to summing integrator 26. The particular type of compensation employed may be any of various types suitable for converting the error signal on line 23 to terms and on a scale suitable for accurately operating the manipulated variable after integration. At the summing integrator, the error signal on line 25 and input signal on line 21 are summed and integrated and the result provided at output 27. This output represents the value of the manipulated variable to which actuator 11 is set. This signal is supplied on line 19 to response generator 17 and on line 28 to thereby operate the actuator 11.

The operation of the circuitry of FIG. 1 in both the fine and coarse modes will now be described. In fine mode, input 18 remains steady at a value representing the desired value of the controlled variable of process 10. Since the input 18 is a steady state value, response generator 17 operates, as will be explained hereinafter, to supply no or a zero-valued, output signal on line 21. The response generator 17 also operates to provide an output signal on line 22 that is exactly equal to the input from line 18 and thereby represents the desired steady state value of the process controlled variable. The actual instantaneous value of the process controlled variable is provided on line 14 by the instrument 12. These two values are supplied to opposite inputs of summing amplifier 15.

The summing amplifier compares the desired value of the controlled variable to the actual value of the controlled variable and supplies the difference, or error, signal on line 23 to feedback compensation circuitry 24. The error signal so supplied by circuitry 15 represents the direction and magnitude of the correction to the controlled variable required to bring the controlled variable into agreement with its desired value. Feedback compensation circuitry 24 divides the error signal by the value of process gain, which is a predetermined constant, and differentiates the result. These two functions may be accomplished by commercially available electronic circuitry. The value of the process gain is normally determined through experimentation by the incremental adjustment of actuator 11 by a predetermined small amount and noting the corresponding change in measured value of the controlled variable.

The output of the compensation circuitry 24 is supplied as one input to summing integrator 26. As previously stated, in fine mode, there is no derivative signal appearing on line 21 from response generator 17. Therefore, summing integrator 26 merely integrates the compensated error signal on line 25 and supplies the integrated signal on output 27, via line 28, to thereby operate the actuator 11. The operation of the actuator 11 in accordance with the signal on line 28 is of a direction and amplitude to change the process such that the controlled variable will approach to equal the desired value appearing on line 22, thereby reducing the error to zero.

By virtue of the lack of a derivative input on line 21, and the steady state appearance of input 18 directly on line 22, operation of the circuitry of FIG. 1 in fine mode is basically the same as conventional feedback systems.

In coarse mode, however, the operation of the circuitry of FIG. 1 is significantly different from that of conventional feedforward systems.

In conventional systems employing feedforward, a change in the input 18 produces a signal similar to that of the derivative input on line 21 which represents the best estimate, based upon process model equation, of the signal required to drive the process from the inital state to the new state of input 18.

In the system of FIG. 1, the signal representing the new input is supplied on line 18, a signal representing the present state of the manipulated variable is provided on line 19, and the signal representing the present state of the controlled variable is supplied on line 16. As will be explained hereinafter with respect to FIG. 9, response generator 17 employs those signals to supply two, different, output signals. The first output signal is on line 21 and comprises the estimated input to the manipulated variable required to drive the process from the present value of the controlled variable to the desired value of the controlled variable as supplied on input line 18. As with conventional feedforward systems, the derivative input is based upon the process model equation.

In addition to the signal on line 21, response generator 17 provides a signal on line 22. This signal is the calculated feasible response of the controlled variable to the operation of the actuator 11 in accordance with the supplied derivative input on line 21. The calculated feasible response signal on line 22 is also based upon the process model equation, taking into account the dead time of the process. Conventional feedforward systems do not provide this signal.

The derivative signal on line 21 is supplied to summing integrator 26. The error signal on line 25 may be assumed to be zero initially and therefore, summing integrator 26 merely integrates the derivative signal on line 21. The resultant drive signal at output 27 is applied on line 28 to actuator 11. The signal so supplied normally drives the actuator on a time-optimal basis. This means that the actuator is driven to its predetermined limit so as to change the process 10 at the fastest possible rate to the new state. The response generator 17 determines the value and time to supply the derivative input signal to drive the actuator to its limit value. Then, response generator 17 terminates the derivative input signal for a time period calculated thereby as will be explained hereinafter. After the calculated time, the response generator supplies a derivative input on line 21 of direction opposite to the original. This derivative input, when integrated, causes actuator 11 to be driven to the value calculated for it to ultimately assume in fine mode to maintain the controlled variable at the desired steady state value.

The actual response of the controlled instrument to the operation of actuator 11 is measured by istrument 12. This signal is supplied on line 14 to summing circuit 15, where it is compared to the calculated feasible response appearing on line 22. This comparison indicates how well the process controlled variable is following the calculated response. Any difference therebetween reflects the result of any external disturbances to the process occurring during coarse mode or reflects any inaccuracies in the process model equation.

This error signal is supplied on line 23 to feedback compensation circuitry 24 where it is for example, divided by the gain and differentiated, as with respect to fine mode. The compensated error signal produced thereby is supplied on line 25 to summing integrator 26. The summing integrator thus integrates the differentiated error signal and provides a signal on output 27 thereby to adjust actuator 11 to compensate for external disturbances or for inaccuracies in the process model equation.

Based upon the model equation, the calculated feasible response on line 22 ultimately reaches the steady state value. At this time, the system is automatically in fine mode, there being no switching from coarse to fine mode as in a conventional system.

Figure 2:
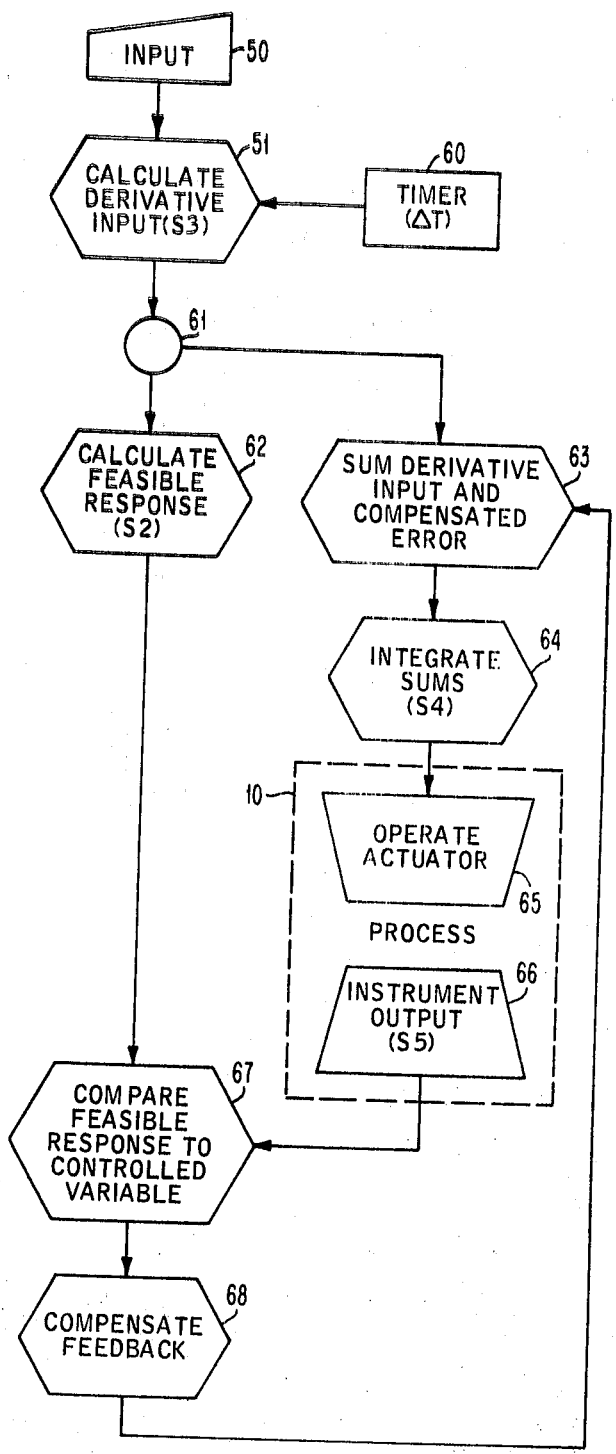
FIG. 2 comprises a flow chart illustrating a process and a dual mode control method therefor in accordance with the present invention.

The method of the present invention is illustrated by the flow chart of FIG. 2. Certain of the steps of the overall method shown in FIG. 2 are illustrated in detail in the flow charts of FIGS. 3–7, which apply more strictly to a digital embodiment.

The method of FIG. 2 may be performed by various types of apparatus. The first example already mentioned is the analog circuitry system of FIG. 1. Other examples comprise the pneumatic, hydraulic or fluidic equivalents of the analog circuitry of FIG. 1, or digital electric circuit equivalents thereof. A still further example of apparatus serving as an embodiment for the method of FIG. 2 comprises a programmed general purpose digital computer system, such as that illustrated in FIG. 8.

Figure 8:
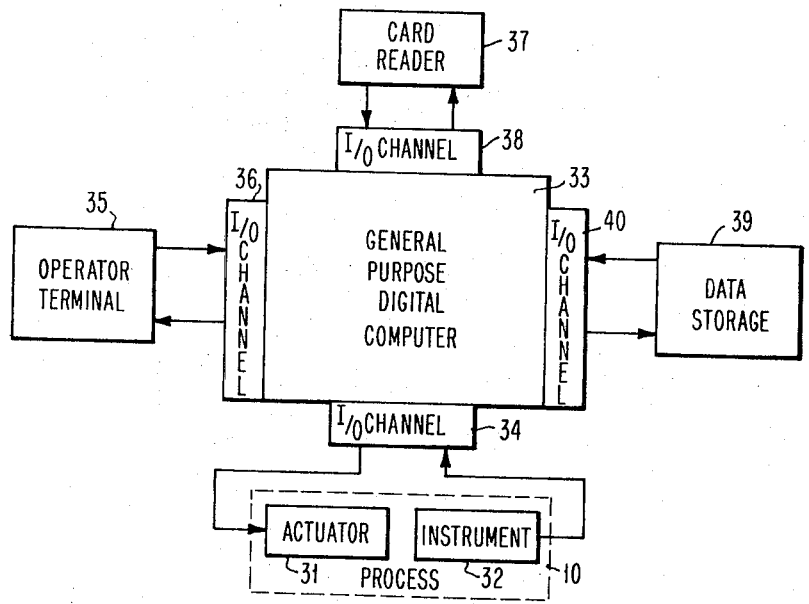
FIG. 8 comprises a diagrammatic illustration of a process and a general purpose digital computer arranged to control the process.

Referring to FIG. 8, the process 10, or process stage 10, is illustrated wherein the manipulated variable is controlled by an actuator 31. This actuator will perform the same result as the actuator 11 of FIG. 1 but will be operated by digital, rather than analog, signals. Similarly, the controlled variable of the process is measured by means of an instrument 32 which measures the same controlled variable as instrument 12 of FIG. 1, but which provides digital electric signals. The actuator 31 and instrument 32 are connected to a general purpose digital computer 33 by an input-output channel 34. Input-output channels are a portion of general purpose digital computers allowing communication between the computer and external devices. Some general purpose digital computers are especially adapted for process control, such as the IBM 1800 Control and Data Acquisition Computer. In such process control computers, an I/O channel 34 is provided capable of converting the digital information of the computer to analog signals for operating an analog actuator and for converting analog signals from an analog instrument to digital signals for the computer.

Manual inputs to the system comparable to input line 18 of FIG. 1 are accomplished in a general purpose digital computer system by an operator terminal 35. The operator terminal is connected to an input-output channel 36 and supplies digital information from the operator to the computer.

The method of FIG. 2, and as detailed in FIGS. 3–7, is applied in a general purpose digital computer by means of a computer program. The program is embodied in a deck of cards supplied to a card reader 37. The card reader reads the deck of cards and communicates the program to the general purpose digital computer 33 by means of an input-output channel 38. The digital computer does not have the internal core memory capability for storing all of the programs supplied, and therefore stores the portions of the programming not being immediately used in a data storage device 39. Examples of such data storage devices are the IBM 2310 Direct Access Storage Device (Disk File). The data storage device 39 is connected to the computer by means of an input-output channel 40.

The method illustrated in FIGS. 2–7 is shown in the flow chart format employed by computer programmers to write programs that may be punched on cards and supplied to card reader 37. Therefore, the implementation of the flow charts directly to a computer program is relatively straightforward, as is understood by those skilled in the art.

Referring to FIG. 2, the process 10 is the same as that shown in FIGS. 1 and 8. For ease of explanation, the coarse mode portion of the illustrated method will be described first.

Block 50 represents the input signal supplied to the general purpose digital computer 33 of FIG. 8, supplied by operator terminal 35, or may comprise the input signal supplied on line 18 of FIG. 1 to response generator 17. The input indicates the new desired value of the controlled variable of the process. Based upon that input, the method proceeds to step 51, the calculation of the derivative input. This is the signal supplied on line 21 of FIG. 1 by response generator 17. Basically defined, the derivative input is the derivative with respect to time of the action of the manipulated variable that will cause the controlled variable to assume the new desired state at a time-optimal rate.

Figure 10:
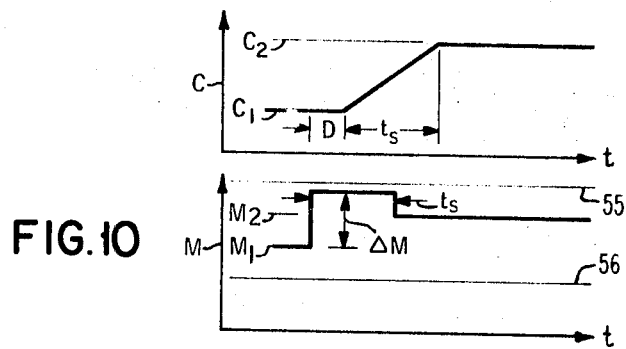
FIG. 10 comprises a graphical illustration of the manipulated variable and controlled variable with respect to time.

This may be better visualized by reference to FIG. 10. In FIG. 10, $C1$ indicates the initial steady state value of the controlled variable. $C2$ represents the new desired value of the controlled variable supplied by input 50. $M1$ represents the initial steady state value to which the manipulated variable is set to maintain the controlled variable at value $C1$. The relationship between $M1$ and $C1$ is illustrated by the following model equation representing the steady state relationship of the process: $M1=C1/G$, where $G$ represents process gain, defined above. Similarly, $M2$ represents the steady state value of the manipulated variable to maintain the controlled variable at the new desired value $C2$. $M2$ is related to $C2$ in the same way, namely: $M2=C2/G$.

In FIG. 10, lines 55 and 56 represent the limits of manipulation of actuator 11 or 31. For example, a valve can be opened only to its limit of opening and can be closed only to a certain limited point without totally disrupting the process. Thus, the control action to be executed by coarse mode operation to change the process from state $C1$ to state $C2$ in the least time is that illustrated by operating the actuator near its limit. This is illustrated by changing the manipulated variable from $M1$ to $M1+\Delta M$.

At some future time, the manipulated variable must be changed to state $M2$. In coarse mode, the model equation for process 10 is dynamic and classically is illustrated by the following first order differential equation:

$$C(t) = GM(t-D) - T\frac{dc(t)}{dt};$$

wherein $D$ represents the process dead time and $T$ represents the process time constant. Both the dead time and time constant are constants of the process 10 that are determined experimentally.

Based upon that equation, the switching time $(ts)$, comprising the time from operation of the actuator to its limit to the time when the actuator is returned to a value $M2$, is determined by the following equation:

$$ts = D \cdot \log\left[1 - \frac{(C2-C1)}{\Delta M \cdot G}\right].$$

Thus, step 51 comprises calculating $\Delta M$ and supplying the derivative thereof with respect to time at the initial time, calculating the switching time $ts$, calculating the change in the manipulated variable required to go from $M1+\Delta M$ to $M2$, and supplying the derivative of the result with respect to time at time $(t+ts)$. Apparatus for accomplishing this calculation will be described in more detail with respect to FIGS. 3–7 and 9. Since the output of step 51 is time related, a way of indicating time 60 forms a part of the method, as will be explained.

The derivative output of step 51 is shown in the method flow chart as employed for the method to proceed, via connector 61, to step 62 and also to step 63. Step 62 comprises the calculation of the feasible response for the controlled variable of the process in response to the derivative input from step 51. This step is based upon the equation representing $C(t)$, the response of the controlled variable with respect to time, which response is illustrated in FIG. 10.

In step 63, the derivative input from step 51 and any compensated error are algebraically summed. The compensated error will be discussed hereinafter. In step 64, the sums from steps 63 are integrated and employed to operate actuator 11 or 31. In the embodiment of FIG. 1, steps 63 and 64 are combined in summing integrator 26, and in the apparatus of FIG. 8, the steps of algebraic addition (step 63) and integration (step 64) are well known programmable operations of the digital computer 33.

Upon integration, the resulting output is employed in step 65 to operate the actuator 11 or 31. In the embodiment of FIG. 1, the output of summing integrator 26 is applied directly to the analog actuator 11, and in the embodiment of FIG. 8, the result of the integration is supplied by the computer, via input-output channel 34 to operate the actuator 31.

In step 66, the instrument 12 or 32 supplies an output. In the embodiment of FIG. 1, the output 13 of the instrument 12 is supplied on line 14, and in the embodiment of FIG. 8, the output of instrument 32 is supplied, via input-output channel 34, to the digital computer 33.

In step 67, the output of the instrument 12 or 32 is compared to the feasible response calculated in step 62. The comparison is accomplished in the embodiment of FIG. 1 by summing amplifier 15 and in the embodiment of FIG. 8 by the general purpose digital computer 33. The error signal resulting from this comparison represents the difference between the calculated feasible response from step 62 and the actual state of the controlled variable as measured in step 66. Any difference is the result of either an inaccuracy in the feedforward model of the process as employed in step 51 or is the result of some outside change occurring to the process 10 while in coarse mode.

As the output of step 67 represents the instantaneous error in the controlled variable, this output is converted in scale and to derivative form for controlling the manipulated variable in step 68. This is accomplished by dividing the result of step 67 by constant $G$ the experimentally determined process gain, and then by differentiating that result. This step is easily accomplished by the programmed general purpose digital computer of FIG. 8 and by the feedback compensation circuitry 24 of FIG. 1.

The result of step 68 is then supplied to step 63 where it is summed with the derivative input from step 51. The resultant sum is integrated in step 64 as previously described, and employed to operate actuator 11 or 31 as shown in step 65.

In summary, the input 50 changing the desired value of the controlled variable from $C1$ to $C2$ results in step 51 supplying the initial $\Delta M$ derivative input to step 63, where it is summed with any error feedback and integrated in step 64 and, in step 65, operates the actuator by the amount $\Delta M$. At the same time, the feasible response of the controlled variable $C$ is determined in step 62 and compared in step 67 to the actual measured value of the controlled variable supplied by the instrument output in step 66. This comparison indicates any errors by the controlled variable in not accurately following its calculated response. Any error is compensated by changing it from absolute controlled variable terms to derivative manipulated variable terms in step 68 and supplying to be summed in step 63. In step 63 the error is summed, integrated in step 64, and applied to adjust the actuator in step 65 to compensate for any inaccuracy in the feedforward model of the process or for some outside change that might have occurred to the process while in coarse mode. At a later time, step 51 supplies the derivative signal to step 63 which, when integrated in step 64 operates the actuator 65 to return the actuator to value $M2$, as modified by any feedback error signal.

Coarse mode is completed when the controlled variable $C$ reaches the new desired value $C2$ as determined by input step 50. With all errors adjusted for by means of the present invention, the result of the calculated feasible response from step 62 and the actual measured output from step 66 of the controlled variable will reach the new value $C2$ at the same time. Upon reaching the value $C2$, coarse mode is completed by definition. At this time the output from step 62 will be equal to the $C2$ value set by input step 50. Should there be any error, the feedback steps 67, 68, 63, 64 and 65 operate to adjust the manipulated variable so as to compensate for the error. At this time, the system is operating in fine mode in the normal manner. Thus, there is no formal switching from coarse to fine mode, but rather an automatic change which may be defined as the moment that the controlled variable $C$ or the calculated feasible repose from step 62 reaches value $C2$.

The detailed implementation in the general purpose digital computer 33 of FIG. 8 of steps 51 and 62 will now be described with reference to FIGS. 3-7.

To make the utilization of general purpose digital computer systems more economical, the convention in process control situations has been to operate the computer in a multiprocessing mode. This means that the computer cannot devote its entire time to a single program, but rather must share its capability among several programs. The computer therefore cannot be continually checking to determine whether an input from operator terminal 35 is signalling a request to change the controlled variable. The normal approach is for all operations of the terminal 35 with respect to the computer 33 to be conducted with a special terminal program stored in the computer's memory. The communications between the terminal and computer are thus conducted under the control of the terminal program and, should the terminal operator indicate a change in the controlled variable, this information will be stored by the terminal program in a selected position in the computer's memory.

The computer contains a timing means and at periodic intervals, such as once every 10 seconds, initiates step 100. Step 100 calls out step 101 which causes the information stored in the selected position in the computer memory to be read, and step 102 causes this information to be compared to the information in another position in the computer memory defined as S1 LAST, which is the previous desired setting for the output variable $C$. If these two values are equal, the comparison step 102 refers to step 103. This step is merely an exit or termination of the small subroutine comprising steps 100-103.

If, however, the comparison indicates that the two values are not equal, the comparison step 102 refers to step 104. The reference to step 104 may comprise the calling of the routine beginning with step 104 from data storage device 39 into the computer memory.

In this routine, step 104 causes the setting of a position in memory called $C2$ to the new value S1 supplied as the input of step 101, which is the new desired value of the controllable variable. In step 105, the new steady state value of the manipulated variable ($M2$) corresponding to the new desired value of the controllable variable ($C2$) is calculated in accordance with the illustrated equation. In that equation, $G$ is a constant stored in the computer memory representing the process gain, previously described.

In step 106, the value of the controlled variable is determined by reading the output of instrument 32. The output of the instrument is called signal S5. The computer 33 accomplishes step 106 by reading, via channel 34, the output of instrument 32.

In step 107, the position in memory representing initial value of the controlled variable ($C1$) is set to the value (S5) read in step 106. The initial value of the manipulated variable ($M1$) is then calculated from the initial value of the controlled variable in accordance with the illustrated equation and employing the same process gain ($G$) as utilized in step 105. The value ($M1$) represents the steady state value of the manipulated variable required to maintain the controlled variable ($C1$) at its present value.

Figure 3:
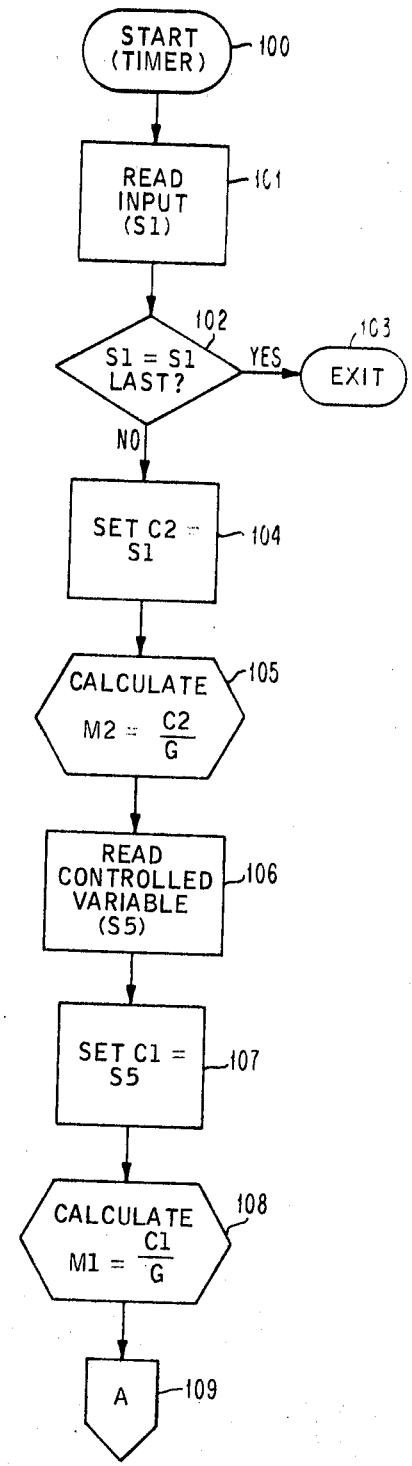
FIGS. 3–7 comprise flow charts illustrating in more detail the steps of calculating derivative input and calculating feasible response of FIG. 2.
Figure 4:
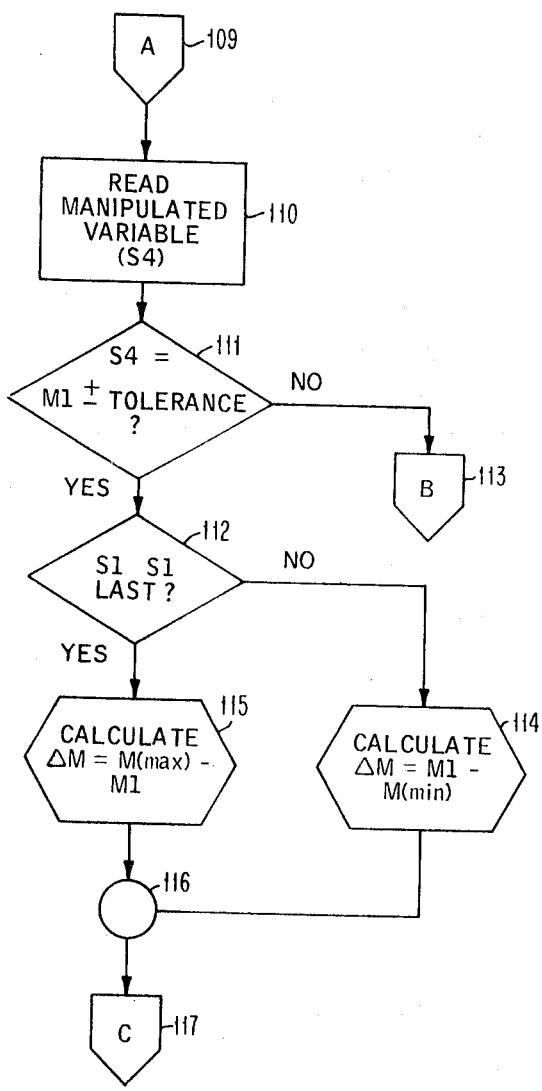

Connector 109 merely serves to illustrate the progression from step 108 of FIG. 3 to step 110 of FIG. 4. In step 110, the actual output of the computer to actuator 31 is read. The signal as read is called signal S4. Signal supply to the actuator 31 is continuous and is supplied from a register in the input-output channel 34. The computer merely samples the contents of this register to accomplish step 110. In step 111, the actual value of the manipulated variable (S4) is compared to the steady state value of the manipulated variable ($M1$) as determined in step 108 as expanded by a range of plus or minus a predetermined tolerance. If the actual value of the manipulated variable (S4) lies within this range of tolerances, the system is operating satisfactorily within the steady state control range, or fine mode. In such case, the comparison indicates that the subject method of coarse mode control may be employed and proceeds to step 112.

If, however, the actual value of the manipulated variable (S4) does not lie within this tolerance range, the system may be responding in fine mode to an extremely drastic external disturbance to the process or may be undergoing a coarse mode change. In either case, the method of FIG. 2 may not be employed and the comparison proceeds to connector 113. Connector 113 refers to a standard, non-optimal feedforward method of control and will be discussed hereinafter with reference to FIG. 6.

Continuing with the subject time-optimal method of coarse mode control, the new input (S1) representing the new value of the controlled variable (C2.) is compared again to the previous value (S1 LAST) in step 112. Unlike the comparison in step 102, this comparison indicates whether the new value is larger or smaller than the previous value. Referring additionally to FIG. 10, this comparison indicates whether $\Delta M$ will be limited by limit 55, M(max.), or by limit 56, M(min.). If the new value (S1) is smaller, $\Delta M$ is calculated in step 114 by subtracting the initial value of the manipulated variable (M1) from the lower limit, M(min). If, however, the new desired value of the controlled variable is greater, as illustrated in the example of FIG. 10, $\Delta M$ is determined in step 115 by subtracting the initial value of the manipulated variable (M1) from the upper limit 55, M(max.).

Figure 5:
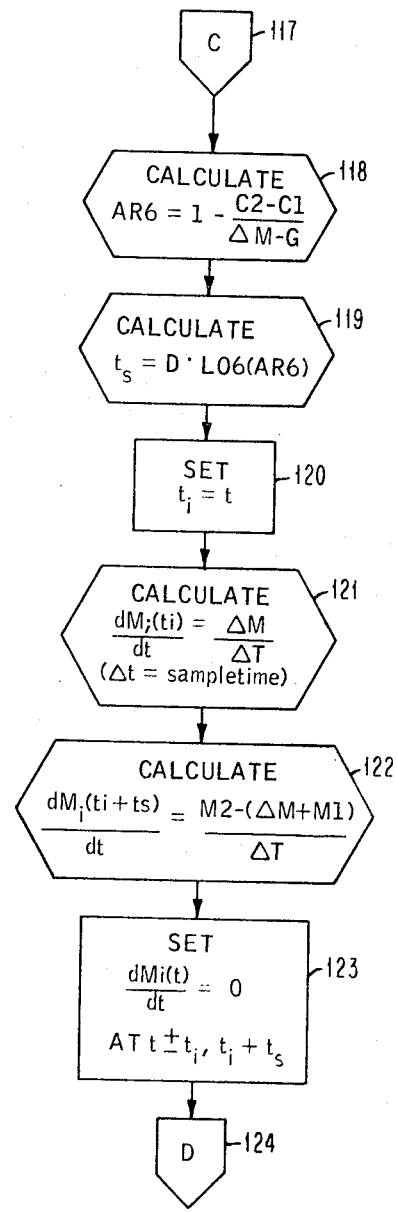

Upon calculating $\Delta M$ in one of these two ways, connector 116 indicates that the method then proceeds as indicated by connector 117 of FIG. 4 to step 118 of FIG. 5. Step 118 comprises a series of straightforward programmable calculations employing the value determined in previous steps. In these calculations, C1 from step 107 is subtracted from C2 from step 104. Then, $\Delta M$ from step 115 or 114 is multiplied by the constant G, previously discussed. The difference from the subtraction C2–C1 is then divided by the product of $\Delta M$ times G. The resultant quotient is then subtracted from 1 to form the result of the calculations of step 118, called the "argument."

Step 119 comprises additional calculations to be conducted on the "argument" obtained from step 118. The first calculation comprises actually a table lookup, from a table stored in the computer Memory, of the logarithm of the number comprising the "argument." The resultant logarithm is then multiplied by a predetermined constant D. This predetermined constant represents the dead time of the process and was previously determined as discussed above. The result of this multiplication is the time (ts) between application of signal to drive the actuator to its limit and the time to return the actuator to the new manipulated variable value, as illustrated in FIG. 10.

In step 120, the current time, meaning the time of day, as obtained from the accumulation total kept by the timer employed in step 100, is stored in the position in the computer memory designated as "ti."

In step 121, the quantity $\Delta M$ is obtained in step 114 or step 115 is divided by predetermined constant $\Delta T$. The predetermined constant $\Delta T$ represents the period between signals from timer 60 in FIG. 2. This is the time between samples, or sample time of the system. The resultant quotient is then stored in a position in the computer memory designated as the derivative of M with respect to time at time (ti).

In step 122, another calculation is made, the result of which is called the derivative of M with respect to time at time (ti+ts). This calculation comprises the addition of the quantity $\Delta M$ from step 115 or step 114 to the quantity designated as M1 from step 108, that sum subtracted from the quantity M2 from step 105. The remainder from that subtraction is then divided by the predetermined constant $\Delta T$, discussed above. The resultant quotient is then stored in a position in the computer memory designated as the derivative of M with respect to time at time (ti+ts).

Step 123 requires the storing of a zero in the position in core memory designated as the derivative of M with respect to time at time ≠ either (ti) or (ti+ts).

All of the numbers to be employed to supply the derivative input (S3) of step 51 have now been stored.

Figure 6:
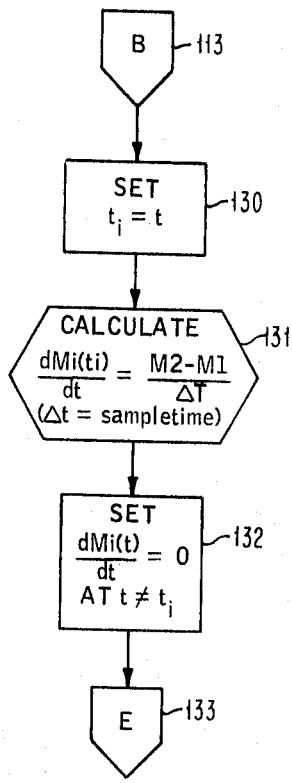
Figure 7:
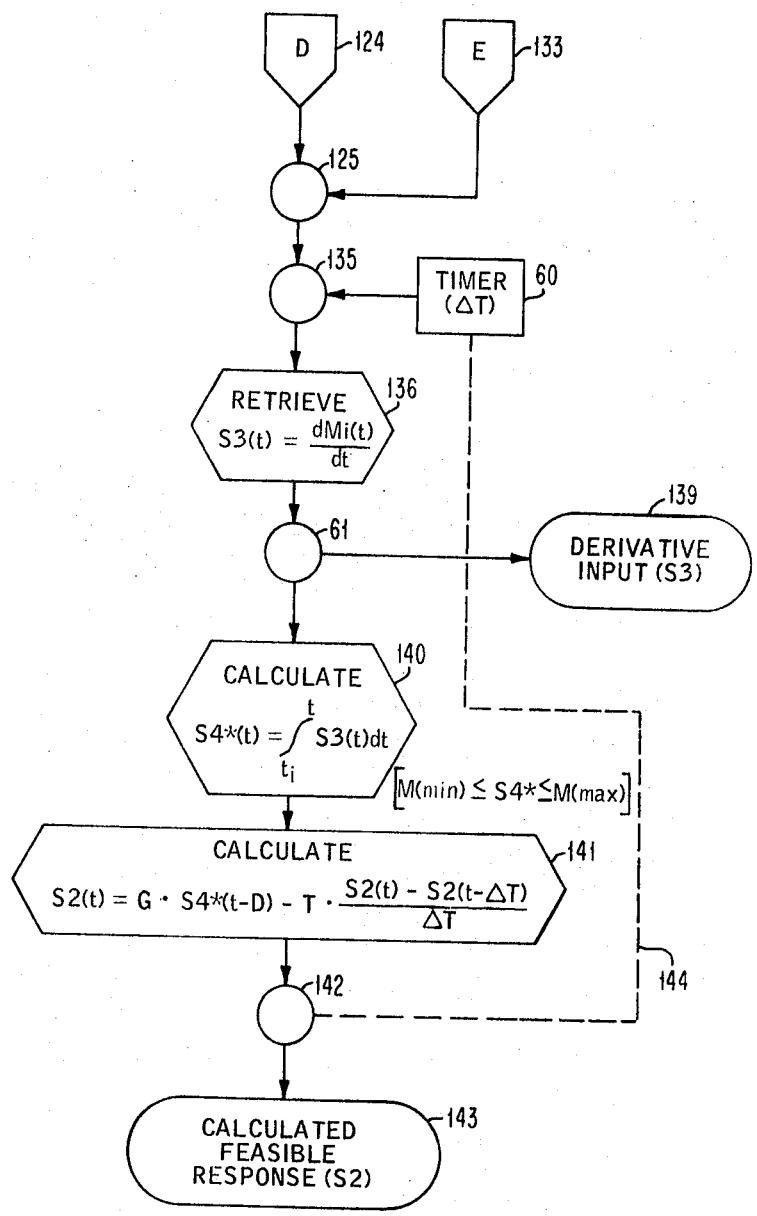

Connector 124 of FIG. 5 now indicates that the method proceeds to connector 125 of FIG. 7. This connector indicates the joining of either the time-optimal calculation steps just discussed or the non-optimal calculations, as will now be discussed with respect to FIG. 6.

Connector 113 of FIG. 6 was reached from the branching step 111 of FIG. 4 wherein the actual measured value (S4) of the manipulated variable differed from the steady state value (M1) thereof by an amount more than a predetermined tolerance. Thus, rather than use the time-optimal basis for changing the process as based upon the calculations of FIG. 5, the conventional non-optimal calculations will be employed. The first step of these calculations 130 is to set a number representing the present time of day (t) into a position in the computer memory designated as (ti).

In step 131, the quantity M1 from step 108 is subtracted from quantity M2 from step 105. The resultant remainder is then divided by the predetermined quantity $\Delta T$, previously discussed. The resultant quotient is stored in the position in the computer memory designated as the derivative of M with respect to time at time (ti).

In step 132, the position in core memory designated as the derivative of M with respect to time at time ≠ (ti), is set with the number 0.

This completed the calculations for the non-optimal changing of the process. Connector 133 of FIG. 6 therefore refers to step 125 of FIG. 7 where the method joins the calculations of the time-optimal leg of the previously discussed branching step. Connector 135 indicates that the remaining steps are conducted under the continuous control of a timer 60. This timer supplies an operating pulse at every sample period ($\Delta T$) to thereby accomplish the remaining steps of FIG. 7.

The first step of the sequence is step 136. Step 136 comprises the retrieval of the signals stored at the position in the computer memory designated as the derivative of M with respect to time at the time (t) at the instant the signal is received from timer 60. The signals so retrieved are designated as S3(t) and are supplied, via connector 61, to steps 139 and 140. Connector 61 is the same connector 61 as shown in FIG. 2, step 139 comprises the termination of step 51 in supplying the derivative input (S3) to step 63 of FIG. 2, and step 140 comprises the first step within step 62 of FIG. 2.

For the sake of illustration, several of the operations of step 136 at various times will be discussed.

The time of the initial operation of timer 60 will be equal to time (ti). Thus, in step 136, the retrieval comprises the retrieval of the signal at the position in the computer memory designated as the derivative of M with respect to time at time (ti). Depending upon whether the optimal or non-optimal branch was employed, this stored set of signals is either that obtained from step 121 or that obtained from step 131.

At the next operation of timer 60, the time is (ti+$\Delta T$). The retrieval step therefore retrieves the signals representing the derivative of M with respect to time at that time. This number is either that obtained from step 123 or from step 132, and in either case is zero.

When the timer 60 operates at the time (ti+ts), the retrieval step 136 retrieves either the number obtained as the result of step 122, or from step 132, depending upon which of the branches was employed.

Returning to step 140, it comprises the integration of S3(t) with respect to time as obtained from step 136. The actual computer operation to accomplish this integration comprises merely the algebraic accumulation of each derivative input (S3) as received from step 136. This is the calculation which would be equal to the calculation obtained in step 64 of FIG. 2 provided that there was not compensated error included within the integration. The note for step 140 indicates recognition that the actuator 31 will only operate approximately within the limits M(max.) to M(min.), which limits will have been employed in the calculation of $\Delta M$. A test may be made to check the calculation result of step 140 (S4*) against these limits as a type of error checking procedure. This is not a requirement for step 140.

Step 141 comprises a fairly complex calculation for calculating the feasible response (S2). In that step, the output of step 140 (S4*), not for the present time (t), but rather for a prior time (t−D), is multiplied by the constant G, discussed above. D represents the process dead time and is predetermined as discussed above. S4*(t−D) therefore refers to the output of step 140 at a particular prior time. From that product is subtracted the remainder of the equation. In that equation, T represents the time constant of the process, which is another predetermined constant discussed above. S2(*t*) represents the present result of the calculation, from which is subtracted the immediately prior result, called S2(*t*−Δ*T*) as shown, that remainder is divided by Δ*T*, representing the predetermined time constant of timer 60. This equation is the easiest for visualizing step 141. In practice the calculation would be made in accordance with the following equation:

$$S2(t) = \frac{[G \cdot S4^*(t-D) + (T/\Delta T) \cdot S2(t-\Delta T)]}{[1 - T/\Delta T]}.$$

The calculations conducted in accordance with the above equation include storage [of S4*(*t*−*D*) and S2(*t*−Δ*T*) until *t*], multiplication, division, addition and subtraction, all of which are easily accomplished by the general purpose digital computer 33, the programming of which to accomplish the calculation is very straightforward.

The result of step 141 comprises the calculated feasible response (S2) of the process 10 as the result of (S3) applied derivative input (S3 provided as step 139. The calculated feasible response is supplied, via connector 142, to step 67 of FIG. 2 by step 143. The dotted line 144 from connector 142 to timer 60 merely represents that the complete cycle of operation comprising steps 136, 139–143 has been accomplished in response to the pulse output of the timer, and will occur at the next sample time in response to the next pulse output of the timer.

Referring additionally to FIG. 2, the derivative input (S3) 139 of FIG. 7 comprises the output from step 51 of FIG. 2 as supplied to step 63. The calculated feasible response (S2) 143 of FIG. 7 comprises the output of step 62 as applied to step 67 of FIG. 2. Accordingly, the feasible response (S2) is compared to the actual state (S5) of the process 10 in step 67. Any error detected thereby is compensated in step 68 and summed in step 63 with the present derivative input (S3) from step 139 of FIG. 7. The sum is integrated in step 64 (S4) and employed to operate the actuator in step 65. Thus, whether the time-optimal branch of FIG. 5 or the non-optimal branch of FIG. 6 was selected by branching step 111 of FIG. 4, the derivative input (S3) will be calculated accordingly and, similarly, the feasible response (S2) will likewise be calculated accordingly.

Thus, the subject method provides a way of compensating for any inaccuracy in the feedforward model of the process, or compensating for any externally occurring change to the process while in coarse mode.

The operation of the method of FIGS. 3–7 when in fine mode will now be briefly discussed.

Referring to step 123 of FIG. 5 and step 132 of FIG. 6, it will be recalled that the portion of the computer memory designated as the derivative of *M* with respect to time at all times other than time (*ti*), and in step 123 time (*ti*+*ts*), is set to zero. Thus, in step 136 of FIG. 7, when the derivative is retrieved the derivative input (S3) so retrieved will be equal to zero at any time other than (*ti*) or (*ti*+*ts*). Since the derivative input so supplied is equal to zero, the subsequent integration in step 64 of FIG. 2 comprises adding zero to the existent value. The result of step 64 comprises signal S4 which is employed to operate the actuator in step 65. This output is the value of the integration until time and is equal to the value *M*2 as illustrated in FIG. 10 subject to any error adjustment.

Similarly, with respect to step 140, the integration of S3 stops when the derivative input signal S3 is zero and, after the coarse mode derivative signals are supplied at time (*ti*) for the non-optimal response, and at times (*ti*) and (*ti*+*ts*) for the time-optimal response, the result of the integration remains stationary at value M2.

In step 141, the value S4* from step 140 will similarly be the value M2 after the dead time D. This value equal to M2 is then multiplied by the process gain G and is therefore equal to the desired value of the process output variable C2. As the resultant value then remains constant since no increase in the value of S4* occurs, S2(*t*) is equal to the immediately prior value S2(*t*−Δ*T*). The numerator for the last part of the equation is therefore equal to zero, so that the resultant calculated feasible response (S2) is equal to the desired value of the process output variable (C2) supplied from the input step 50 of FIG. 2. This constant output is supplied at step 143 as the output from step 62 in FIG. 2. Any deviation of the measured process control variable step 66 therefore comprises an error when compared in step 67 to the constant value of step 62. Such difference is compensated in step 68 and applied through a feedback loop in step 63, integrated in step 64 and employed to operate the actuator in step 65 thereby to correct any fine mode errors of the process.

In this manner, the method illustrated in FIGS. 2–7 automatically switches from coarse mode to fine mode operation.

Figure 9B:
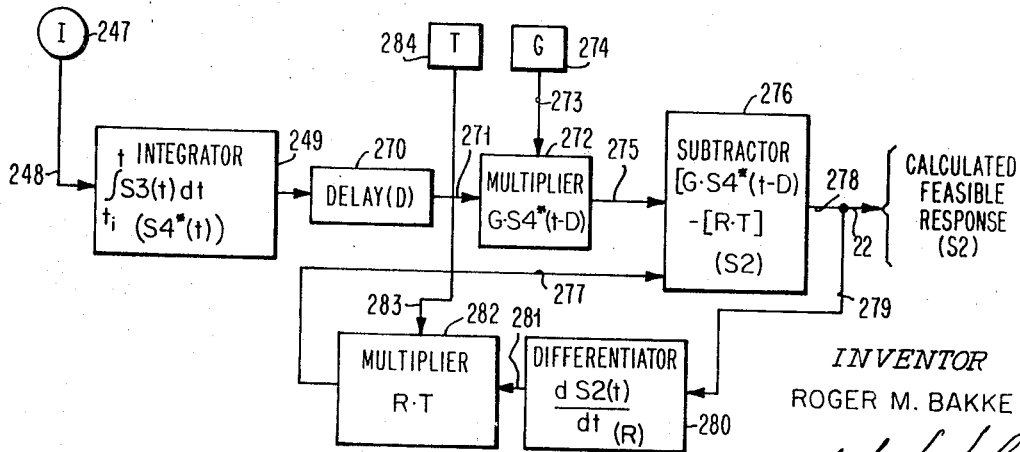
FIG. 9, comprising FIGS. 9A and 9B, comprises a diagrammatic illustration of analog circuitry comprising an example of the response generator of FIG. 1.
Figure 9A:
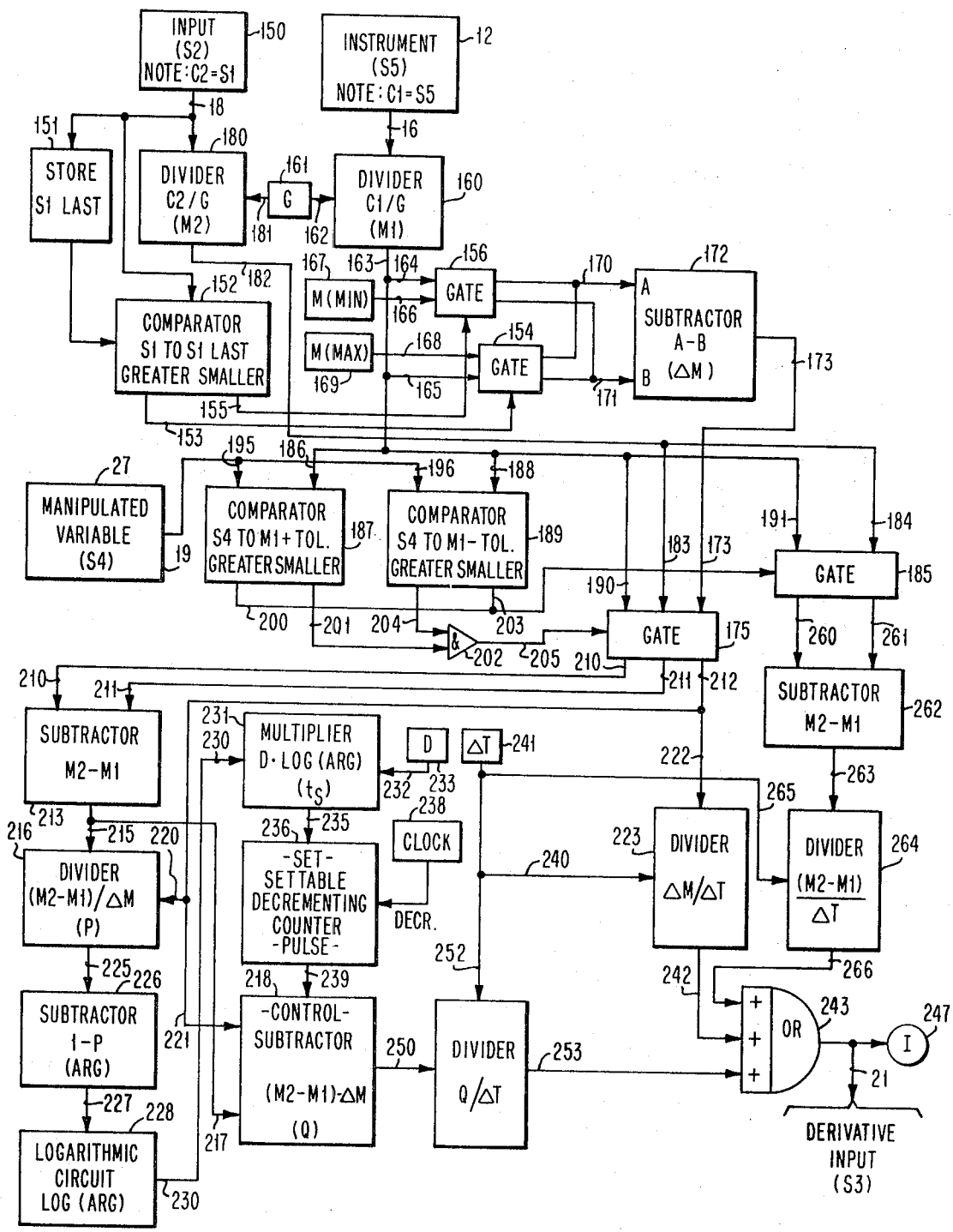

Referring to FIG. 9, the electronic circuitry comprising the response generator 17 of FIG. 1 will now be described.

As previously discussed, the analog input to the system may comprise a manually settable potentiometer 150. The resultant analog signal is supplied on line 18 to the response generator 17. This input signal is supplied to a short term delay or storage circuit 151 and to one input of a comparator circuit 152. In the comparator circuit this input (S1) is compared to the immediately prior value of input (S1) from the delay circuit 151. If the comparison indicates that the present input (S1) is greater than the prior one, an output signal is supplied on line 153 to operate gate circuit 154. If, however, the present input (S1) is the smaller, an output signal is provided by the comparator on output line 155 to thereby operate gate circuit 156.

The instrument 12 of FIG. 2 supplies the measurement of the actual value (S5) of the controlled variable of process 10 on line 16 to the response generator. In the response generator, the signal is applied to divider 160. Dividers are complicated, but commercially available, electronic circuits. The input from line 16 comprises the dividend, and a voltage source 161 having a constant amplitude representing the process gain (G) is supplied to the divider on line 162, comprising the divisor. The divider 160 therefore divides the input on line 16 by the input on line 162 to produce signal a signal the quotient, which signal is supplied on line 163. This output of the divider is called M1 and represents the initial value of manipulated variable equivalent to the initial value of the controlled variable as obtained from the instrument 12. This output (M1) of divider 160 is supplied to input 164 of gate 156 and input 165 of gate 154. Another input to gate 156 comprises line 166, which is connected to voltage source 167. This voltage source is an amplitude representing the minimum limit 56 of the manipulated variable shown in FIG. 10. The other input to gate circuit 154 comprises line 168 connected to voltage source 169. Voltage 169 comprises an amplitude representing the maximum limit 55 of the manipulated variable in FIG. 10.

Therefore, if comparator 152 supplies an output on line 153 to indicate that the new input (S1) is the greater, gate 154 is operated to supply the signals on lines 168 and 165 to, respectively, inputs 170 and 171 of subtractor 172. In that event, the subtractor 172 operates to subtract the signal representing M1 on line 171 from the signal representing the maximum limit of the manipulated variable on line 170. The difference comprises the maximum change in the manipulated variable (Δ*M*). This difference signal is supplied on line 173.

However, should the comparator 152 indicate that the present input (S1) is the greater, it provides a signal on line 155 to operate gate 156 so that the signals on lines 164 and 166 are supplied, respectively, to lines 170 and 171. In that event, the subtractor 172 operates to subtract the signal representing the minimum limit of the manipulated variable on line 171 from the value M1 on line 170. This difference signal represents the maximum negative change in the manipulated variable (Δ*M*), which signal is supplied on line 173. The output on line 173 is supplied to gate 175.

The input (S1) on line 18 is also supplied to divider 180, comprising the dividend. The output of voltage source 161 is supplied on line 181 to the divider 180, comprising the divisor.

Divider 180 is structurally the same as divider 160 and thereby divides the input signal on line 18 by the voltage representing process gain on line 81 to produce a quotient signal on line 182. The amplitude of the quotient signal represents the steady state value of the manipulated variable (M2) corresponding to the desired value of the controlled variable (C2).

The signal on line 182 is supplied to input 183 of gate 175 and input 184 of gate 185. In addition, output 163 from divider 160 is supplied to input 186 of comparator 187, input 188 of comparator 189, input 190 of gate 175 and input 191 of gate 185. Lastly, output 27 from summing amplifier 26 of FIG. 1 comprises the actual manipulated variable signal (S4) supplied to actuator 11 and is supplied on line 19 to response generator 17. This signal on line 19 is applied, in the response generator, to input 195 of comparator 187 and input 196 of comparator 189.

In comparator 187, the signal appearing on line 186 is summed internally with a bias voltage representing the tolerance discussed with respect to step 111 of FIG. 4. The value of the manipulated variable (S4) at input 195 is then compared to this summed value to indicate whether the actual value of the manipulated variable (S4) exceeds the tolerance, indicating that the time-optimal approach cannot be used. If it exceeds the tolerance, comparator 187 provides a signal on output line 200 thereby to operate gate circuit 185. If, on the other hand, the value lies within the tolerance, comparator 187 supplies an output signal on line 201 to one input of AND circuit 202.

Similarly, comparator 189 internally subtracts a bias voltage representing the tolerance from the signal appearing at input 188, and then compares the remainder to the signal appearing at input 196. This indicates whether the actual value of the manipulated variable (S4) is below the tolerance level. If the comparison indicates that it is below the tolerance level, the comparator provides an output signal on line 203 which then operates gate 185. If, on the other hand, the actual value of the manipulated variable (S4) is not below the tolerance level, the comparator 189 supplies a signal on line 204 to the other input of AND circuit 202.

Thus, if the actual value of the manipulated variable (S4) lies outside the tolerance range, one of the comparators supplies a signal on line 200 or 203 to thereby operate gate 185 to operate the system on a non-optimal basis. If, however, the actual value of the manipulated variable lies within the tolerance range, both comparator 187 and comparator 189 supply output signals on, respectively, lines 201 and 204 to AND circuit 202, operating the AND circuit to thereby supply a signal on line 205 so as to operate gate circuit 175 to thereby operate the system on a time-optimal basis.

Assuming that gate circuit 175 is operated, the signals on lines 190, 183 and 173 are supplied, respectively, on lines 210, 211 and 212. The signals on lines 210 and 211 are supplied to subtractor 213. The subtractor is conventional and operates to subtract the signal on line 210, representing M1, from the signal on line 211, representing M2. The resultant remainder is supplied to input 215 of divider 216, comprising the dividend, and to input 217 of subtractor 218.

The other output of gate circuit 175 is supplied on line 212 to input 220 of divider 216, comprising the divisor, to input 221 of subtractor 218, and to input 222 of OR circuit 223.

Divider 216 is structurally similar to dividers 160 and 180 and divides the quantity (M2 − M1) supplied on line 215 by the signal (ΔM) supplied at input 220. The resultant quotient (P) is supplied on line 225 to subtractor 226. The subtractor subtracts the signal supplied on line 225 from an internal bias voltage level of value equal to "1." The remainder from this subtraction is called the argument (ARG) and is supplied on line 227 to logarithmic circuit 228.

Logarithmic circuit 228 is a conventional, non-linear circuit whose response curve is arranged to approximate that of the exponential logarithms. The circuit 228 thus operates to convert the value supplied on line 227 to the corresponding amplitude equivalent to the logarithm thereof and supplies this signal on line 230 to multiplier 231. The other input to multiplier 231 comprises a signal on line 232 from the constant voltage source 233. The amplitude of the voltage at source 233 is established at an amplitude equal to the representation of the deadtime (D) experimentally determined for the process, as discussed above. The multiplier 231 operates to multiply the signal on line 230 by the signal on line 232. This product represents the time (ts) and is supplied on line 235 to the SET input of settable decrementing counter 236. The counter includes an analog to digital converter responsive to the signal appearing on line 235. The converter supplies, in response to that signal, a signal on a selected one of a plurality of lines to a corresponding stage of a digital counter, thereby turning on that stage. The stages of the counter are connected to input line 237 from clock 238. The clock 238 is equivalent to the timer 60 of FIG. 2 and supplies a pulse at periodic intervals determined by the sampling period ΔT. The counter stages are connected to input line 237 so that each pulse appearing thereon decrements the counter one stage. When the counter is decremented to the last, or zero, stage, the counter provides an output pulse on line 239 to the control input of subtractor 218. In this manner, the pulse is provided on line 239 at time (ts) after the initial operation of gate 175.

At the time gate circuit 175 is operated, the signal on line 212 is supplied to the dividend input 222 of divider 223. The divisor input 240 to the divider comprises the output of voltage source 241. The voltage source 241 is set to the predetermined value representing the value of the sample time period ΔT. Divider 223 is similar in structure to dividers 160 and 180 and provides as the quotient the result of the division of the signal representing ΔM and line 222 by the signal representing ΔT on line 240. The divider additionally comprises a time constant control to terminate the output after time period ΔT. This quotient is provided on line 242 to OR circuit 243. The OR circuit transmits this (S3) signal on lines 21 and 246. The signal on line 21 comprises the derivative input to the summing integrator 26 of FIG. 1. The signal on line 246 is supplied, via connector 247, to input 248 of integrator 249.

The output on lines 21 and 246 therefore occurs at time (ti), the initial time of operation for the actuator 11. At the subsequent time (ti+ts), counter 236 supplies a signal on line 239 to the control input of subtractor 218. At this time, subtractor 218 is operated to subtract the signal on line 217 (ΔM) from the signal appearing on line 221 (M2−M1). The remainder (Q) is supplied on line 250 to the dividend input of divider 251. The divisor input 252 comprises the voltage from voltage source 241. Divider 251 is identical to divider 223 and thereby functions to divide the remainder (Q) by the voltage representing ΔT. The resultant quotient is then supplied for the time period ΔT on line 253, via OR circuit 243, and line 21, to the summing integrator 26, and on line 246, via connector 247, to integrator 249.

The second signal comprising derivative input (S3) on lines 21 and 246 comprises the signal returning the manipulated variable from the value M1+ΔM, shown in FIG. 10, to the value M2. These first and second derivative input signals are the result of the time-optimal circuitry.

However, if comparator 187 or comparator 189 indicated that the actual value of the manipulated variable (S4) was outside the tolerance range, gate 185 would be operated to thereby operate the non-optimal circuitry.

Upon operation of gate 185, the signals appearing on lines 191 and 184 are gated, respectively, to inputs 260 and 261 of subtractor 262. The subtractor 262 is conventional and operates to subtract the signal (M1) on line 260 from the signal (M2) on line 261. The remainder is supplied on line 263 to the dividend input of divider 264 which is the same as divider 223. The divisor input 265 of the divider comprises the voltage from voltage source 241, representing the value of ΔT. The divider then divides the signal on line 263 by the signal on line 265, and the resultant quotient supplied for time period ΔT on line 266, via OR circuit 243, to lines 21 and 246. This signal comprises the non-optimal operation of the circuitry and merely causes the manipulated variable signal resulting from the operation of summing integrator 26 to go from the value M1 to the value M2.

As previously stated, each of these outputs is transmitted on line 246 via connector 247 and line 248 to integrator 249. Integrator 249 comprises a standard long-time-constant integration and storage circuit, which algebraically integrates the applied signals. The output of the integrator is supplied to delay circuit 270 which delays the applied analog signal a time period equal to the deadtime ($D$) of the process 10.

The delayed signal is then applied to input 271 of multiplier 272. The other input 273 to the multiplier is connected to voltage supply 274, the amplitude of which is at a value representing the process gain ($G$). The multiplier thus multiplies the delayed integrated signal from integrator 249 by process gain.

The resultant product is supplied on line 275 to subtractor 276. The other input to the subtractor comprises the signal appearing on line 277. The subtractor subtracts the signal on line 277 from the product appearing on line 275. The difference is supplied on line 278 and fed back, via line 279, to a differentiator 280. The differentiator 280 is standard, having a time constant equal to $\Delta T$, thereby providing the derivative of any change in $S2$ with respect to time $\Delta T$ over the time $\Delta T$.

The output of the differentiator is then supplied to input 281 of multiplier 282. The other input 283 of the multiplier comprises the signal from voltage source 284. The voltage source is established at an amplitude representing the time constant ($T$) of the process. The resultant product is then supplied on line 277 as the other input to subtractor 276.

Therefore, the net output appearing from subtractor 276 comprises the calculated feasible response ($S2$) appearing on line 22 and transmitted to the summing circuit 15 of FIG. 1.

The above description of response generator 17 of FIG. 1 comprises the detailed circuitry to accomplish the described method of FIGS. 2 through 7 in electrical analog circuitry. It should be obvious to those skilled in the art that equivalent analog pneumatic or hydraulic circuitry may be devised, as well as equivalent digital special purpose circuitry.

What is claimed is:

1. In a process having a manipulated variable and a controlled variable, said manipulated variable effecting control of said controlled variable, a method of coarse mode control changing said controlled variable to a new condition in response to a command signal designating said new condition, comprising the steps of:
    providing a control signal in response to said command signal for the operation of said manipulated variable in a predetermined manner to cause said change of said controlled variable;
    providing a feasible response signal representing the predicted response of said controlled variable to said control signal operation of said manipulated variable;
    measuring the actual response of said controlled variable, providing a measurement signal representing said actual response;
    comparing said feasible response signal to said measurement signal to provide an error signal indicating both the direction and magnitude of the difference therebetween; and
    summing algebraically said control signal and said error signal for controlling said manipulated variable in accordance therewith.

2. The method of claim 1 for additionally maintaining fine mode control of said controlled variable at said new condition, comprising:
    the additional step of, upon said feasible response signal reaching the value designated by said command signal on a steady state basis, maintaining said feasible response signal at said value designated by said command signal, whereby said measuring and comparing steps provide said error signal; and
    said summing step comprises controlling said manipulated variable in accordance with said error signal.

3. The method of claim 2, wherein said step of providing said control signal in response to said command signal includes arranging said control signal to operate said manipulated variable to cause said coarse mode change of said controlled variable at the optimum rate for said process.

4. The method of claim 3, wherein said manipulated variable may be varied only within preset limits; and
    wherein said step of providing said control signal includes arranging said control signal for operating said manipulated variable near one of said preset limits for the time required to change said controlled variable at the optimum rate for said process.

5. The method of claim 1 wherein said step of providing said control signal in response to said command signal includes the steps of:
    providing a manipulated variable signal representing the condition of said manipulated variable;
    comparing said manipulated variable signal to signals representing the limits of a predetermined tolerance range surrounding the initial steady state value of said manipulated variable to provide a signal indication of the result of said comparison indicating whether said manipulated variable condition is within or without said limits; and
    responding to said signal indication indicating said manipulated variable is within said limits to provide said control signal arranged to operate said manipulated variable to cause said change of said controlled variable at the optimum rate for said process, and responding to said signal indication indicating said manipulated variable is without said limits to provide said control signal arranged to operate said manipulated variable to cause said change of said controlled variable at a non-optimum rate.

6. The method of claim 5 for additionally maintaining fine mode control of said controlled variable at said new condition, comprising:
    the additional step of, upon said feasible response signal reaching the value designated by said command signal on a steady state basis, maintaining said feasible response signal at said value designated by said command signal, whereby said measuring and comparing steps provide said error signal; and
    said summing step comprises controlling said manipulated variable in accordance with said error signal.

7. In a process control system for a process, said system having an input for receiving command signals, actuator means for controlling a manipulated variable of said process, and measuring means for supplying a measurement signal measuring a controlled variable of said process, said manipulated variable effecting control of said controlled variable, there being a predetermined model of said process representing the relationship between said manipulated variable and said controlled variable, the improvement thereto for coarse mode control of said process to change said controlled variable to a new condition in response to a command signal at said input designating said new condition, comprising:
    control and feasible response means responsive to said command signal for supplying a control signal for operating said actuator means to control said manipulated variable in a predetermined manner to cause said change of said controlled variable, and for supplying a feasible response signal in accordance with said predetermined model of said process, said feasible response signal representing the predicted response of said controlled variable to said control signal operation of said manipulated variable;
    comparison means comparing said feasible response signal to said measurement signal to provide an error signal indicating both the direction and magnitude of the difference therebetween; and
    summing means for algebraically summing said control signal and said error signal to operate said actuator means in accordance therewith.

8. The process control system of claim 7 for additionally maintaining fine mode control of said controlled variable at said new condition, wherein said control and feasible response means additionally maintains said feasible response signal at the value designated by said command signal.

9. The process control system of claim 8 wherein said actuator means may be operated only within preset limits; and
wherein said control and feasible response mean supplies said control signal for operating said actuator means near one of said preset limits for the time required to change said controlled variable at the optimum rate for said process.

10. The process control system of claim 9 additionally including:
means for supplying a manipulated variable signal representing the condition of said actuator means; and
said control and feasible response means comprises:
means response to the occurrency of said command signal for determining from said measurement signal the corresponding initial steady state value of the manipulated variable;
means responsive to said determined initial steady state value of the manipulated variable and to signals representing the limits of a predetermined tolerance range for comparing said manipulated variable signal to said limits representing said tolerance range surrounding said initial steady state value to provide a signal indication of whether said actuator means condition is within or without said limits of said range;
control means responsive to said signal indication indicating said actuator means condition is within said limits to provide said control signal for operating said actuator means to control said manipulated variable to cause said optimum rate for said process, and responsive to said signal indication indicating said actuator means condition is without said limits to provide said control signal for operating said actuator means to control said manipulated variable to cause said change of said controlled variable at a non-optimum rate; and
feasible response means for supplying a feasible response signal in accordance with said predetermined model of said process, said feasible response signal representing the predicted response of said controlled variable to said control of said manipulated variable by said actuator in accordance with said provided control signal.

* * * * *